United States Patent
Aaron

(10) Patent No.: US 7,974,634 B2
(45) Date of Patent: Jul. 5, 2011

(54) CONTENT FORWARDING FOR BANDWIDTH CONSERVATION

(75) Inventor: Jeffrey A. Aaron, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 788 days.

(21) Appl. No.: 12/024,660

(22) Filed: Feb. 1, 2008

(65) Prior Publication Data

US 2009/0197614 A1    Aug. 6, 2009

(51) Int. Cl.
*H04Q 1/00* (2006.01)
(52) U.S. Cl. ............................ 455/456.1; 455/422.1
(58) Field of Classification Search .......... 455/456.1, 455/456.2, 456.3, 457, 466, 566, 517, 518, 455/519, 404.1, 404.2, 414.1; 370/310, 328, 370/338; 709/204, 205, 220; 701/200, 213, 701/214; 705/5, 7, 14; 340/995.18, 988
See application file for complete search history.

(56) References Cited

U.S. PATENT DOCUMENTS

| | | | |
|---|---|---|---|
| 6,470,189 B1* | 10/2002 | Hill et al. | 455/517 |
| 7,024,156 B2* | 4/2006 | Kawamata et al. | 455/3.02 |
| 2002/0107808 A1* | 8/2002 | Dobbelaar | 705/52 |
| 2003/0220970 A1* | 11/2003 | Komsi | 709/204 |
| 2004/0148090 A1* | 7/2004 | Melen | 701/200 |
| 2005/0111418 A1* | 5/2005 | Yang et al. | 370/338 |
| 2006/0111106 A1* | 5/2006 | Moon et al. | 455/435.2 |
| 2006/0242234 A1* | 10/2006 | Counts et al. | 709/204 |
| 2008/0020801 A1* | 1/2008 | Fesas et al. | 455/561 |
| 2008/0039123 A1* | 2/2008 | Oh | 455/466 |
| 2008/0242290 A1* | 10/2008 | Bhatia et al. | 455/422.1 |

* cited by examiner

*Primary Examiner* — Jean A Gelin
(74) *Attorney, Agent, or Firm* — Hope Baldauff Hartman, LLC

(57) ABSTRACT

Embodiments described herein provide for conserving bandwidth. A cluster of cellular devices is identified. Each cellular device in the cluster may be within a given proximity from at least one other cellular device in the cluster. A seed is selected from the cluster of cellular devices. A schedule associated with a content item to be distributed to the cluster of cellular devices is identified. The schedule identifies which of the cellular devices in the cluster receive the content item. A cellular tower is instructed to transmit the content item and the schedule to the seed. Upon receiving the content item, the seed may forward the content item to another cellular device in the cluster according to the schedule.

17 Claims, 4 Drawing Sheets

CONTENT FORWARDING FOR BANDWIDTH CONSERVATION

BACKGROUND

This application relates generally to the field of cellular-related quality of service. More specifically, the disclosure provided herein relates to reducing bandwidth by way of content forwarding.

Cellular-related quality of service ("QoS") issues are a significant source of frustration for service providers as well as their customers. Common QoS issues include bandwidth limitations, jitter, delay and latency, packet loss, and interference. QoS issues may result in a number of problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. QoS problems may result in unacceptable quality of service, causing customer dissatisfaction ranging from annoyance to anger.

As cellular devices become more pervasive, multiple cellular devices may receive the same or similar content at about the same time or within a relatively narrow time frame. For example, a first cellular device may request a video clip, and five minutes later, a second cellular device may request the same video clip. In a conventional cellular network, the cellular tower transmits one copy of the video clip to the first cellular device and another copy of the video clip to the second cellular device. Each transmission from the cellular tower to the first cellular device and the second cellular device requires a certain amount of bandwidth. By transmitting multiple copies of the same content item, the cellular tower may be wasting bandwidth. The excess bandwidth being utilized may affect, among other things, overall quality of service across the cellular network by reducing the available bandwidth for other cellular devices on the cellular network.

SUMMARY

Embodiments of the disclosure presented herein include methods, systems, and computer-readable media for conserving bandwidth. According to one aspect, a method for conserving bandwidth is provided. According to the method, a cluster of cellular devices is identified. Each cellular device in the cluster may be within a given proximity from at least one other cellular device in the cluster. A seed is selected from the cluster of cellular devices. A schedule associated with a content item to be distributed to the cluster of cellular devices is identified. The schedule identifies which of the cellular devices in the cluster receive the content item. A cellular tower is instructed to transmit the content item and the schedule to the seed. Upon receiving the content item, the seed may forward the content item to another cellular device in the cluster according to the schedule.

According to another aspect, a system for conserving bandwidth is provided. The system includes a memory and a processor functionally coupled to the memory. The memory stores a program containing code for conserving bandwidth. The processor is responsive to computer-executable instructions contained in the program and operative to identify a cluster of cellular devices, select a seed from the cluster of cellular devices, identify a schedule associated with a content item to be distributed to the cluster of cellular devices, and instruct a cellular tower to transmit the content item and the schedule to the seed. Each cellular device in the cluster may be within a given proximity from at least one other cellular device in the cluster. The schedule may identify which of the cellular devices in the cluster receive the content item. Further, the seed may forward the content item to another cellular device in the cluster according to the schedule.

According to yet another aspect, a computer-readable medium having instructions stored thereon for execution by a processor to perform a method for conserving bandwidth is provided. According to the method, cluster of cellular devices is identified. Each cellular device in the cluster may be within a given proximity from at least one other cellular device in the cluster. A seed is selected from the cluster of cellular devices. A schedule associated with a content item to be distributed to the cluster of cellular devices is identified. The schedule identifies which of the cellular devices in the cluster receive the content item. A cellular tower is instructed to transmit the content item and the schedule to the seed. Upon receiving the content item, the seed may forward the content item to another cellular device in the cluster according to the schedule.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
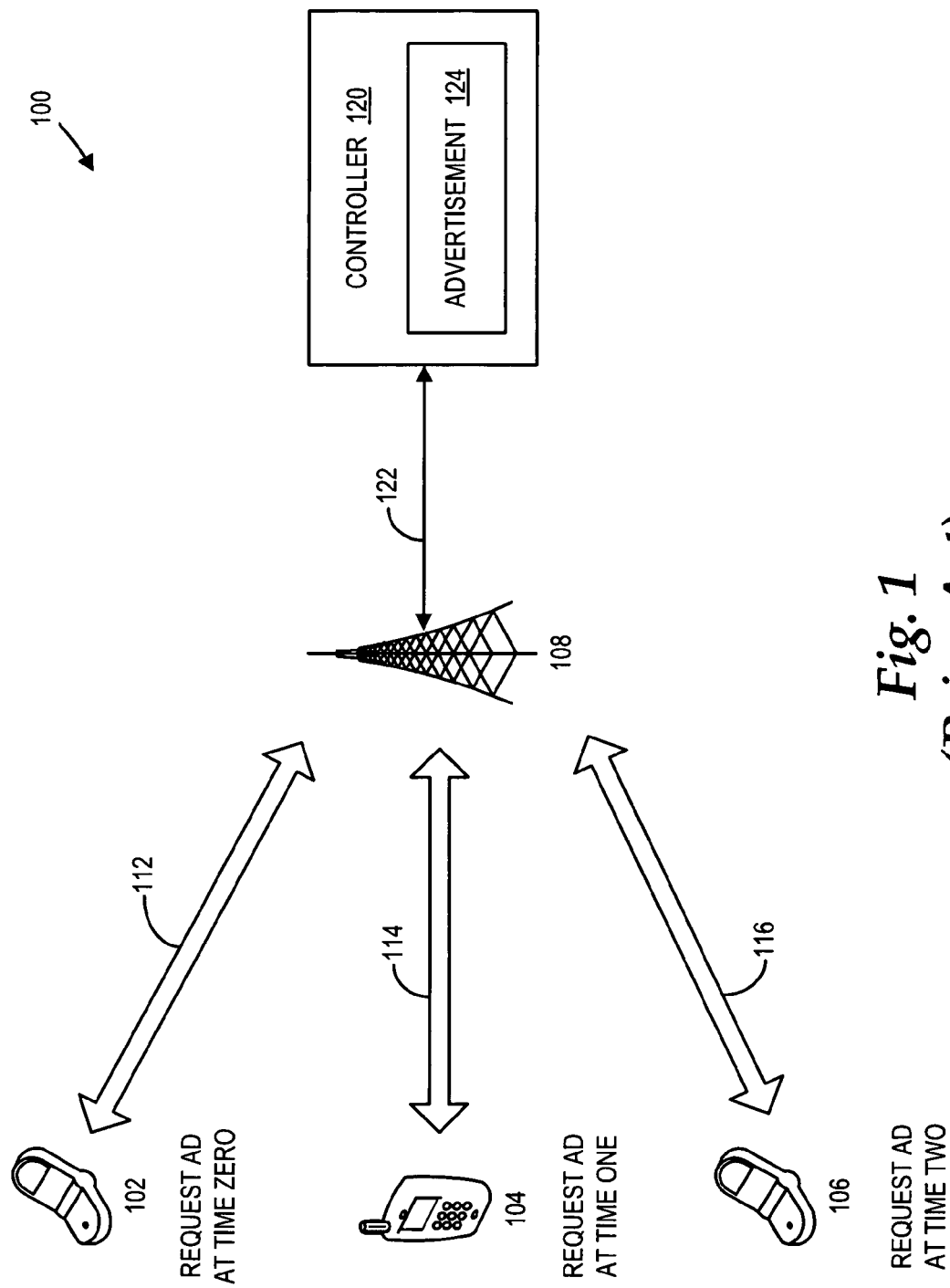
FIG. 1 is a simplified diagram illustrating a conventional cellular network configuration in which a cellular tower utilizes significant bandwidth to transmit content to multiple cellular devices.

The following detailed description is directed to methods, systems, and computer-readable media for conserving bandwidth by forwarding content between multiple cellular devices. In the following detailed description, references are made to the accompanying drawings that form a part hereof, and which are shown by way of illustration through specific embodiments or examples.

Content providers are constantly seeking ways to distribute their content to more people. Examples of content may include, among others, advertisements, news, and entertainment. The content may be in any suitable multimedia format including text, images, audio, video, or combinations thereof. With the increasing popularity of cellular devices and other network attached media devices, content providers are directing more content to these devices. Further, modern cellular devices and cellular networks are capable of distributing and processing high bandwidth content, such as streaming audio and video. As such, content providers can provide richer content to cellular devices than ever before.

As the amount and quality of content transmitted from a cellular tower to the cellular devices increase, the bandwidth utilized by the cellular tower to transmit the content to the cellular devices also increases. Accordingly, the available bandwidth at the cellular tower for other cellular services may decrease. An increase in bandwidth utilization at the cellular tower can have a number of negative effects including, but not limited to, a reduction in the overall quality of service ("QoS") across the cellular network. As such, a reduction in bandwidth utilization at the cellular tower may improve the overall QoS across the cellular network.

Certain content providers, such as advertisers, prefer to push content to the cellular devices, as opposed to transmitting the content in response to a request. The content may be pushed to the cellular devices according to a schedule. Conventional cellular networks are generally unable to push content according to a schedule. In particular, conventional cellular networks are generally designed to transmit content in response to a request.

Even if a conventional cellular network was designed to handle the distribution of content according to a schedule, conventional cellular networks are generally designed to distribute content without considering bandwidth utilization. In an example, a schedule may be created to distribute a content item to a first cellular device and a second cellular device. Conventionally, a cellular tower transmits a first copy of the content item to the first cellular device and a second copy of the content item to the second cellular device. That is, a separate copy of the content item is sent to each requesting cellular device. When a substantial number of cellular devices request the content item, the bandwidth utilized at the cellular tower may exceed capacity. Further, other communications may be adversely impacted, which can be especially problematic if these other communications and their associated services and applications are particularly sensitive to QoS. Even for services and applications which are somewhat less sensitive to QoS, communications quality in general could suffer under these conditions.

The embodiments described herein enable the distribution of content according to a schedule. Further, the embodiments described herein reduce the bandwidth utilized by the cellular tower to distribute content to the cellular devices by utilizing short range or peer-to-peer transmission capabilities of the cellular devices. For example, instead of transmitting separate copies of a content item to the first cellular device and the second cellular device, only one copy is transmitted to either the first cellular device or the second cellular device. If the first cellular device receives the content item, then the first cellular device transmits the content item to the second cellular device. If the second cellular device receives the content item, the second cellular device transmits the content item to the first cellular device.

By eliminating the transmission of at least one copy of the content item from the cellular tower to the cellular devices, the bandwidth utilized at the cellular tower to distribute the content item may be significantly reduced. Even in cases where the content is customized for each cellular device, a substantial portion of the content may be repeated across multiple cellular devices.

Figure 2:
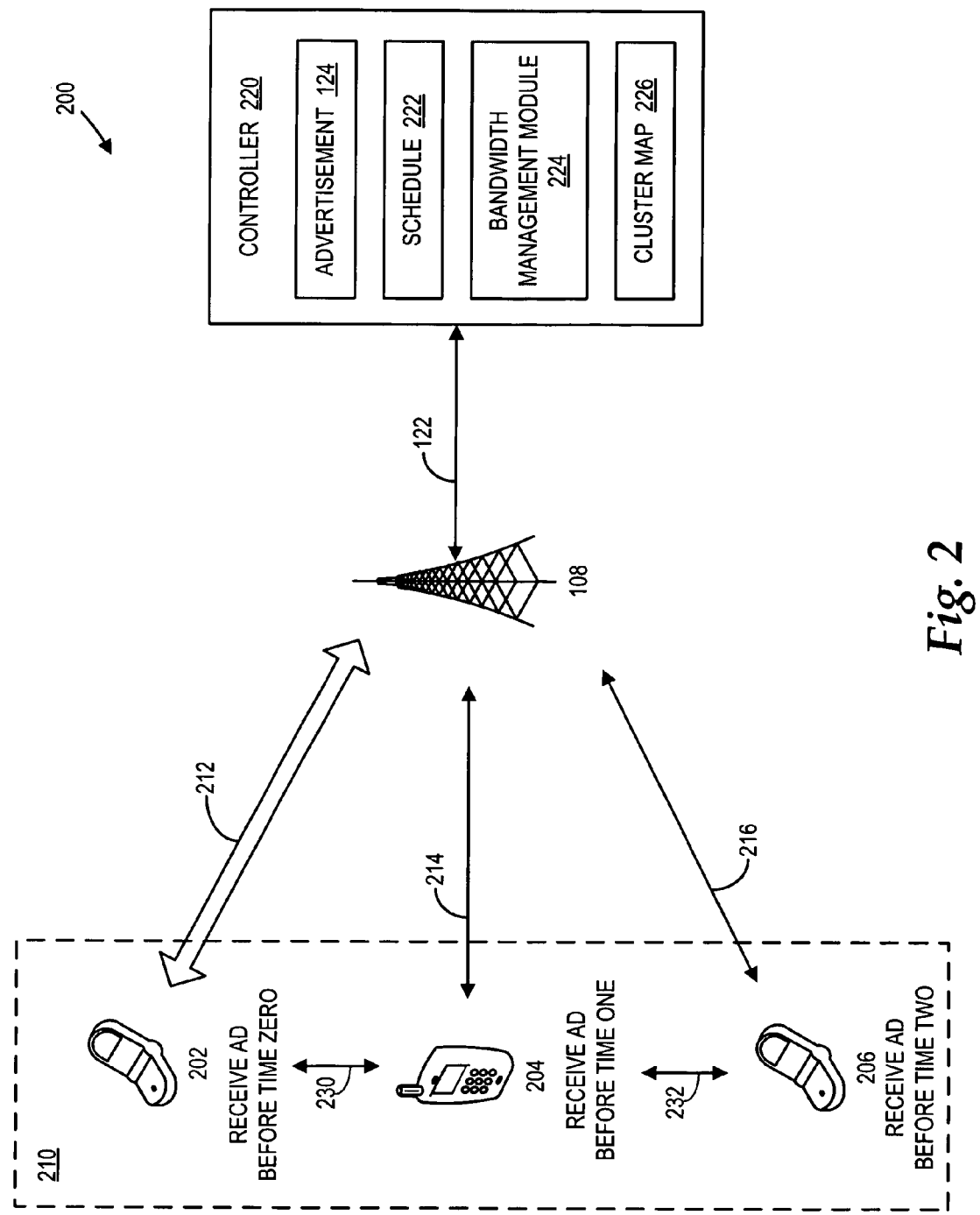
FIG. 2 is a simplified diagram illustrating a cellular network configuration for conserving bandwidth at the cellular tower, in accordance with exemplary embodiments.

Referring now to the drawings, it is to be understood that like numerals represent like elements through the several figures, and that not all components and/or steps described and illustrated with reference to the figures are required for all embodiments. FIG. 1 shows an illustrative example involving the distribution of advertising to multiple cellular devices within a given time frame. FIG. 2 shows an illustrative example involving the distribution of advertising to multiple cellular devices according to a schedule. It should be appreciated that other content may be distributed as contemplated by those skilled in the art. It should further be appreciated that the illustrated distribution may be modified in many useful ways as contemplated by those skilled in the art.

Turning now to FIG. 1, a simplified diagram illustrating a conventional cellular network configuration 100 is shown. The conventional cellular network configuration 100 includes a first cellular device 102, a second cellular device 104, and a third cellular device 106. The first cellular device 102 communicates with a cellular tower 108 via a first wireless link 112. The second cellular device 104 and the third cellular device 106 communicate with the cellular tower 108 via a second wireless link 114 and a third wireless link 116, respectively. Examples of the cellular devices 102, 104, 106 include, but are not limited to, cellular phones, smartphones, personal digital assistants ("PDAs"), and the like. The cellular tower 108 is operatively coupled to a controller 120 via a network 122, such as a wired backbone network. In one embodiment, the controller 120 manages the data transmission to and from the cellular tower 108. In an example, the controller 120 includes an advertisement 124 to be distributed to the cellular devices 102, 104, 106 upon receiving requests from the cellular devices 102, 104, 106.

In the conventional cellular network configuration 100, the cellular devices 102, 104, 106 each transmit a request to the controller 120 when content is requested. The controller 120 transmits the content on-demand to the cellular devices 102, 104, 106 upon receiving the request. In the example illustrated in FIG. 1, the first cellular device 102 transmits a first request for the advertisement 124 at time zero to the controller 120. The second cellular device 104 transmits a second request for the advertisement 124 at time one to the controller 120. The third cellular device 106 transmits a third request for the advertisement 126 at time two to the controller 120. As used herein, time zero is a time prior to time one, and time one is a time prior to time two.

Upon receiving the first request, the controller 120 instructs the cellular tower 108 to transmit a first copy of the advertisement 124 to the first cellular device 102. Upon receiving the second request, the controller 120 instructs the cellular tower 108 to transmit a second copy of the advertisement 124 to the second cellular device 104. Upon receiving the third request, the controller 120 instructs the cellular tower 108 to transmit a third copy of the advertisement 124 to the third cellular device 106. As described above, three separate copies (i.e., the first copy, the second copy, and the third copy) are transmitted to the cellular devices 102, 104, 106. As such, the bandwidth utilized to transmit the advertisement 124 is directly proportional to the number of cellular devices receiving the advertisement 124. With the increasing number of cellular devices increasing at a rapid pace, the amount of bandwidth demanded by the cellular devices may easily surpass the bandwidth capacity of the cellular tower 108.

Turning now to FIG. 2, a simplified diagram illustrating a cellular network configuration 200 is shown, in accordance with exemplary embodiments. As illustrated in FIG. 2, the cellular network configuration 200 includes a first cellular device 202, a second cellular device 204, and a third cellular device 206. The first cellular device 202 communicates with the cellular tower 108 via a first wireless link 212. The second cellular device 204 and the third cellular device 206 communicate with the cellular tower 108 via a second wireless link 212 and a third wireless link 214, respectively. The cellular tower 108 is operatively coupled to a controller 220 via the network 122. The controller 220 also includes the advertisement 124 to be distributed to the cellular devices 202, 204, 206 in accordance with a schedule 222 and a cluster map 226.

According to exemplary embodiments, the cluster map 226 includes information related to a cluster of cellular devices, such as a cluster 210. In particular, the cluster map 226 may specify, among other information, the identity of the cellular devices 202, 204, 206 in the cluster 210 and/or the location of the cellular devices 202, 204, 206 in the cluster 210. While only one cluster 210 and three cellular devices 202, 204, and 206 are shown in FIG. 2 for simplicity of illustration, it should be appreciated that there may be any number of clusters, each including any number of cellular devices. As illustrated in FIG. 2, the cluster 210 includes the first cellular device 202, the second cellular device 204, and the third cellular device 206. In one embodiment, each of the cellular devices 202, 204, 206 in the cluster 210 is within a given proximity from another cellular device in the cluster 210 such that short-range or peer-to-peer communication is viable. For example, in the cluster 210, the first cellular device 202 and the second cellular device 204 are within a given proximity such that they may communicate via a first peer-to-peer link 230. Similarly, the second cellular device 204 and the third cellular device 206 are within a given proximity such that they may communicate via a second peer-to-peer link 232. As described in greater detail below, the first peer-to-peer link 230 and the second peer-to-peer link 232 may enable the distribution of the advertisement 124 while conserving bandwidth at the cellular tower 108.

It should be noted that the peer-to-peer communications can be low power communications. Since the amount of power needed for a communication is generally inversely proportional to the distance between transmitter and receiver, the peer-to-peer communications are relatively less likely to cause co-interference which could degrade QoS. As used herein, peer-to-peer and peer-to-peer protocol are used in the broadest sense of cellular device to cellular device, as opposed to cellular device to tower, and are not limited to any particular methods, technologies, or protocols commonly termed or described as "peer-to-peer."

According to exemplary embodiments, the schedule 222 specifies times at which the cellular devices 202, 204, 206 are scheduled to receive the advertisement 124. In an example, the schedule 222 may specify that the first cellular device 202 is scheduled to receive the schedule 222 at time zero, that the second cellular device 204 is scheduled to receive the schedule 222 at time one, and that the third cellular device 206 is scheduled to receive the schedule 222 at time two. In one embodiment, the schedule 222 is a text file. In one embodiment, the schedule 222 is predetermined and stored in a database (not shown). In a further embodiment, the schedule 222 is dynamically generated.

Generally, the schedule may include items sufficient to describe content delivery requirements and related information. Examples of the schedule may include when the advertisement or other content is needed by each device of the cluster, as well as a margin of safety for each device indicating an amount of time the content should be delivered to the device in advance of the time needed. Thus, the schedule may include the identities and addresses of each device of the cluster, required delivery times for each device, safety margin times for each device, and various other information related to content delivery. The schedule may account for priorities and contingencies which might include possible substitutions of content if content delivery fails, for example.

The schedule may be generated in conjunction with the cluster map. For example, safety margins may be increased based on increasing distance of a device from the seed device. The cluster map may indicate a number of intervening devices necessary to accomplish successive transmissions of the content in order to deliver it to the target device. The cluster map may further indicate additional data items, which may impact content delivery scheduling, descriptive of the cluster devices. Additional data items for a given devices may include parameters, if available, such as expected transmission reliability, radio characteristics (e.g., maximum peer-to-peer transmit power), and the like.

As illustrated in FIG. 2, the controller 220 also includes a bandwidth management module 224. According to exemplary embodiments, the bandwidth management module 224 manages the distribution of the advertisement 124 to the cellular devices 202, 204, 206 in accordance with the schedule 222 and the cluster map 226. In an example, the bandwidth management module 224, in accordance with the schedule 222, instructs the cellular tower 108 to transmit the advertisement 124, the schedule 222, and the cluster map 226 to the first cellular device 202 via the first wireless link 212. In particular, the advertisement 124, the schedule 222, and the cluster map 226 may be transmitted to the first cellular device 202 before time zero according to the schedule 222. While the bandwidth management module 224 is shown only within the controller 220 in FIG. 2, the bandwidth management module 224 may also be included within one or more of the cellular devices 202, 204, 206. In this way, the cellular devices 202, 204, 206 can rely less on the controller 220.

Upon receiving the advertisement 124, the schedule 222, and the cluster map 226, the first cellular device 202 may forward the schedule 222 and the cluster map 226 to the second cellular device 204 via the first peer-to-peer link 230. Subsequently, the second cellular device 204 may forward the schedule 222 and the cluster map 226 to the third cellular device 206 via the second peer-to-peer link 232. Alternatively, the schedule 222 and the cluster map 226 may be transmitted to the second cellular device 204 and the third cellular device 206 via the second wireless link 214 and the third wireless link 216, respectively. It should be noted that the second wireless link 214 is narrower than the second wireless link 114, and that the third wireless link 216 is narrower than the third wireless link 116. The narrower wireless links 214, 216 represent a reduction in bandwidth compared to the wider wireless links 114, 116. That is, the schedule 222 and the cluster map 226 may be relatively smaller files compared to a high-bandwidth content item, such as the advertisement 124.

Upon receiving the schedule 222 and the cluster map 226, the second cellular device 204 may coordinate, with at least the first cellular device 202, the transmission of the advertisement 124 from the first cellular device 202 to the second cellular device 204 prior to time one. Similarly, upon receiving the schedule 222 and the cluster map 226, the third cellular device 206 may coordinate, with at least the second cellular device, the transmission of the advertisement from the second cellular device 204 to the third cellular device 206. For example, the first cellular device 202 may push the advertisement 124 to the second cellular device 204, which may then push the advertisement 124 to the third cellular device 206. Alternatively, the second cellular device 204 may request the advertisement 124 from the first cellular device 202, and third cellular device 206 may request the advertisement 124 from the second cellular device 204. It should be noted that this coordination could range from very simple to very complex. Routing algorithms and/or peer-to-peer methods well known in the art may be used to determine, or help determine, the desired path or forwarding sequence which the advertisement can take through the cluster to reach each device.

It should be appreciated that the cellular devices 202, 204, 206 may store the advertisement 124 for a given period of time, which could be determined via predefined rules operating on the schedule and cluster maps. Basically, when a device in the cluster does not need or is not scheduled to need the advertisement 124 until a later time, the advertisement 124 may be stored, either in the memory of that device or in the memories of intervening devices in the cluster, possibly including the seed. Rules and thresholds can determine when the intervening devices are allowed to store the advertisement and for how long, versus when they need to forward the advertisement 124 in order to meet imminent delivery requirements. In one embodiment, the amount of time that the cellular devices 202, 204, 206 store the advertisement 124 depends, at least in part, on the amount of available memory. In further embodiments, the amount of time that the cellular devices 202, 204, 206 store the advertisement 124 depend on any suitable criteria. The operation of the bandwidth management module 224 is described in greater detail below with respect to FIG. 3.

Figure 3:
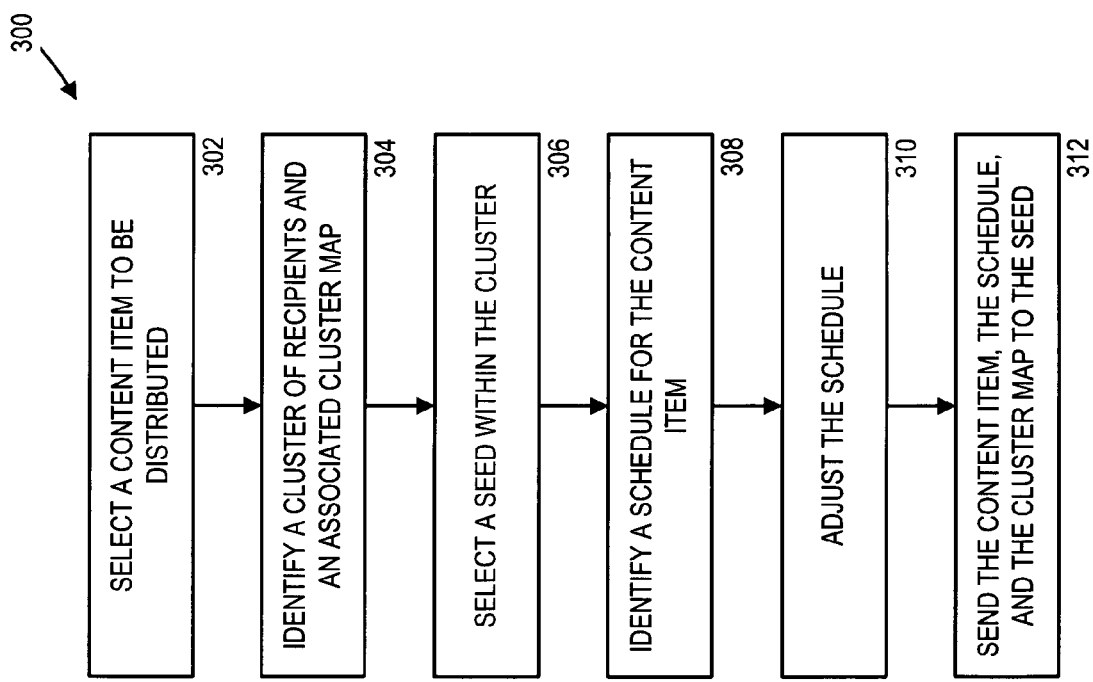
FIG. 3 is a flow diagram illustrating a method for conserving bandwidth at the cellular tower, in accordance with exemplary embodiments.

Turning now to FIG. 3, a flow diagram illustrating a method 300 for conserving bandwidth by forwarding content across multiple cellular devices is shown, in accordance with exemplary embodiments. According to the method 300, the bandwidth management module 224 selects (at 302) a content item, such as the advertisement 124, to be distributed across multiple cellular devices, such as the cellular devices 202, 204, 206. The content item may be any suitable multimedia content that the cellular service provider or a third party provider may seek to distribute to the cellular devices 202, 204, 206 according to a schedule, such as the schedule 222.

Upon selecting the advertisement 124, the bandwidth management module 224 identifies (at 304) a cluster of cellular devices 202, 204, 206, such as the cluster 210, that will receive the advertisement 124 according to the schedule 222. In one embodiment, the bandwidth management module 224 identifies a cluster by identifying cellular devices that are within a threshold proximity such that peer-to-peer communication between the cellular devices is viable. Other factors may affect the cluster may include signal strength and/or the presence of obstructions near the cellular devices.

A particular cluster may be further determined or defined, and then assigned a particular identifier, based on whether potential devices in the cluster receive the content item from that cluster's seed, as opposed to receiving the content item from the seed of an alternate cluster. In this respect, some cellular devices may be members of multiple overlapping clusters, where those different clusters are associated with different content times that are different for each cluster. Determining which cellular devices in the cluster need which content item may be determined via any suitable means, for example, via interfaces with servers or other service elements associated with video delivery, advertisement pushing, and the like. A variety of interfacing and logic methods and technologies may be used for this purpose as contemplated by those skilled in the art.

Each cluster may be defined inclusive of a single content item which is to be distributed by that cluster. Alternately, a cluster may be defined only with regard to proximity, and then commanded to distribute one or more content items. This approach may be utilized when proximity is not controllable since it depends on the movements of the users of the cellular devices. When a cluster is defined to deliver more than one content item, the schedule can be configured to include additional information specifying which of those specific content items each device in the cluster is to receive. Thus, for any content item being sent to a cluster's seed device, that content item can be delivered to a relevant subset of the recipients in the cluster, that is, those devices in the cluster indicated by the schedule to receive the given content item.

An exemplary cluster is the cluster 210, which includes the first cellular device 202, the second cellular device 204, and the third cellular device 206, which serve as cluster members. The second cellular device 204 may be within a certain distance from the first cellular device 202, such that peer-to-peer communication between the first cellular device 202 and the second cellular device 204 is viable. Further, the third cellular device 206 may be within a certain distance from the second cellular device 204 such as that peer-to-peer communication between the second cellular device 204 and the third cellular device 206 is viable. Accordingly, the cluster 210 may be formed because the second cellular device 204 may be linked to the first cellular device 202 via the first peer-to-peer link 230, and the third cellular device 206 may be linked to the second cellular device 204 via the second peer-to-peer link 232.

It should be noted that for a cluster to be viable, no set of cluster members can be isolated from another set of cluster members. As such, it may be necessary but insufficient that each member be able to communicate with at least one other member. For example, two sets of cluster members may exist within a cluster, such that each member communicates with one or more other members, but the cluster is still broken into two non-communicating subsets. Thus, the additional cluster viability requirement given above should also be considered.

In one embodiment, a cluster map, such as the cluster map 226, is generated based on the identified cluster, such as the cluster 210. The cluster map 226 may include any suitable information regarding the cluster 210. For example, the cluster map 226 may include, among other information, the identity of the cellular devices 202, 204, 206 in the cluster 210 and/or the location of the cellular devices 202, 204, 206 in the cluster 210. As described in greater detail below, the cluster map 226 may be forwarded to the cellular devices 202, 204, 206 to facilitate the distribution of the advertisement 124 according the schedule 222.

The proximity between the cellular devices 202, 204, 206 may be determined based on the location of the cellular devices 202, 204, 206. The location of the cellular devices 202, 204, 206 may be determined using any suitable technique including, but not limited to, a global position system ("GPS") or triangulation. The proximity between the cellular devices 202, 204, 206 may also be determined using communication measurements, such as signal strength or ranging.

Upon identifying the cluster 210, the bandwidth management module 224 selects (at 306) one or more seeds within the cluster 210. As used herein, a seed or a seed device refers to a cellular device (i.e., a cluster member) that receives the content item, such as the advertisement 124, directly from the cellular tower 108, as opposed to receiving the content item from another cellular device in the cluster 210. In an example, the first cellular device 202 may be selected as the seed for the cluster 210. The seed may be selected based on any suitable criteria including, but not limited to, available storage space in the seed, bandwidth capacity of the seed, power available in the seed, and/or pre-configured thresholds associated with the seed.

Upon identifying the first cellular device 202 as the seed in the cluster 210, the bandwidth management module 224 identifies (at 308) a schedule, such as the schedule 222, associated with the advertisement 124. In one embodiment, the schedule 222 is pre-generated and retrieved from a storage device (not shown). In a further embodiment, the schedule 222 is generated dynamically according to given criteria. For example, the schedule 222 may seek to push the advertisement 124 to a cellular device in response to the initiation of another application program at the cellular device. The schedule 222 may be generated to ensure optimal distribution of the advertisement 124 and/or optimal bandwidth reduction at the cellular tower 108 and at the cluster 210. The schedule 222 may also be affected by predetermined scheduling policies, content distribution needs, content distributing timing standards, and the like.

Upon identifying the schedule 222 associated with the first cellular device 202, the bandwidth management module 224 adjusts (at 310) the schedule 222. The schedule 222 may be adjusted according to any suitable criteria including, but not limited to, current wireless conditions, historical wireless conditions, historical cellular device usage, and/or the location of the cellular devices 202, 204, 206 in the cluster 210.

Upon adjusting the schedule 222, the bandwidth management module 224 transmits (at 312) the advertisement 124, the schedule 222, and the cluster map 226 to the first cellular device 202 via the first wireless link 212. The first cellular device 202 may forward the schedule 222 and the cluster map 226 to the second cellular device 204. Similarly, the second cellular device 204 may forward the schedule 222 and the cluster map 226 to the third cellular device 206. The schedule 222 and the cluster map 226 may be forwarded from one cellular device to another cellular device during downtime of either or both cellular device or at least before the scheduled transmission of the advertisement 124. Once each of the cellular devices 202, 204, 206 has the schedule 222 and the cluster map 226, the cellular devices 202, 204, 206 may negotiate the distribution of the advertisement 124 according to the schedule 222 without the aid of the cellular tower 108.

Figure 4:
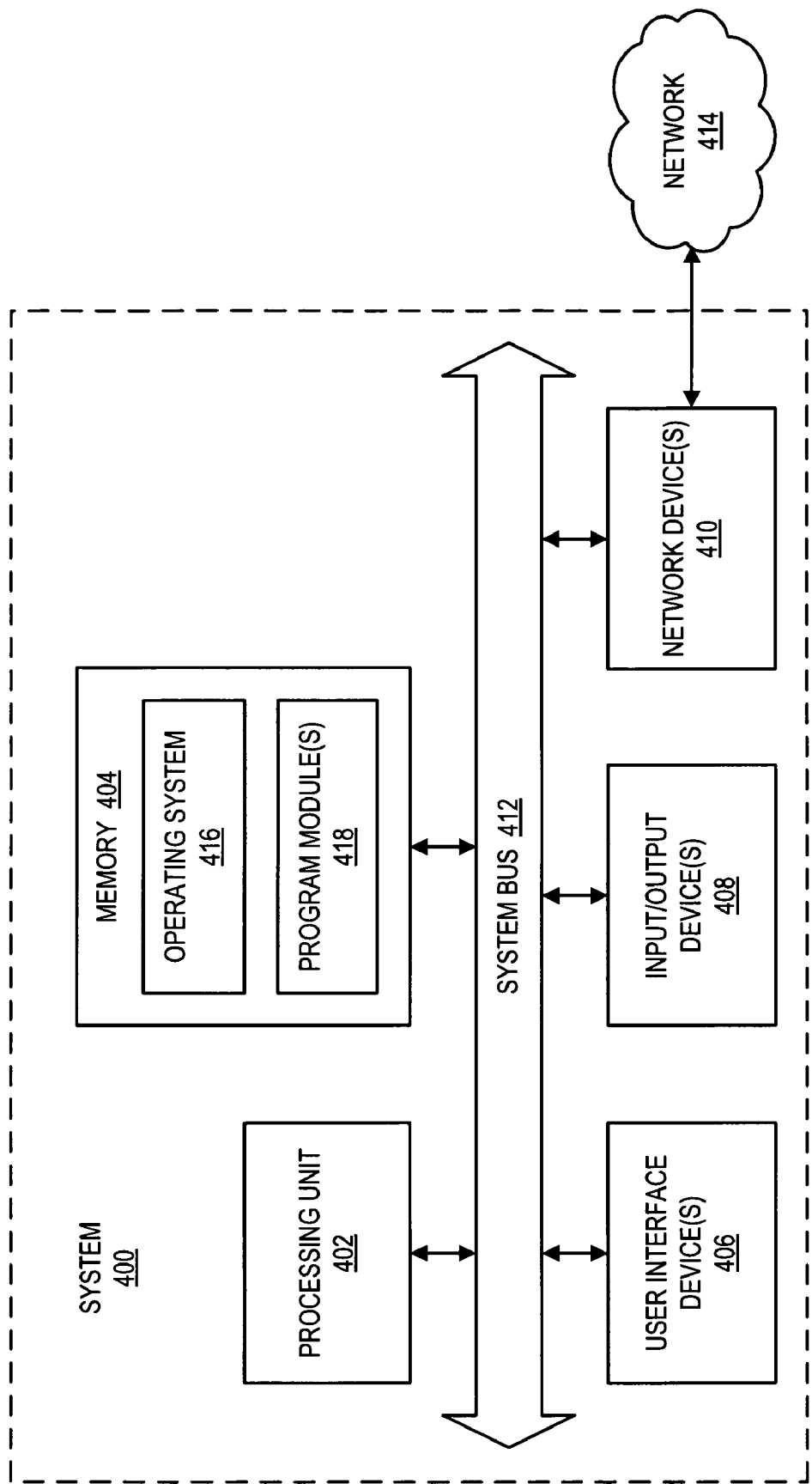
FIG. 4 is a block diagram illustrating the system configured to reduce bandwidth at the cellular tower, in accordance with exemplary embodiments.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a computer system 400 configured to reduce bandwidth at the cellular tower 108, in accordance with exemplary embodiments. Examples of the computer system 400 may include the cellular devices 202, 204, 206 and the controller 220. The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 416 and one or more program modules 418, according to exemplary embodiments. Examples of operating systems, such as the operating system 416, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 418 include the bandwidth management module 224. In one embodiment, the program modules 418 are embodied in computer-readable media containing instructions that, when executed by the processing unit 402, performs the method 300 for conserving bandwidth at the cellular tower 108, as described in greater detail above with respect to FIG. 3. According to further embodiments, the program modules 418 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 418. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 414. Examples of the network 414 may include, but are not limited to, the network 122 and the wireless links 212, 214, 216. Examples of the network devices 410 may include, but are not limited to, a modem, a radio frequency ("RF") or infrared ("IR") transceiver, a telephonic interface, a bridge, a router, or a network card. The network 414 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 414 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for conserving bandwidth, comprising:
identifying a cluster of cellular devices, each cellular device in the cluster being within a given proximity from another cellular device in the cluster;
selecting a seed from the cluster of cellular devices;
identifying a schedule associated with a content item to be distributed to the cluster of cellular devices, the schedule identifying which of the cellular devices in the cluster receive the content item, wherein identifying the schedule associated with the content item to be distributed to the cluster of cellular devices comprises dynamically generating the schedule based on an initiation of another applicable program at the cluster of cellular devices; and
instructing a cellular tower to transmit the content item and the schedule to the seed, wherein the seed forwards the content item to another cellular device in the cluster of cellular devices according to the schedule.

2. The method of claim 1, wherein each cellular device and subset of multiple cellular devices in the cluster is capable of communicating with one other cellular device in the cluster via a peer-to-peer protocol.

3. The method of claim 1, wherein identifying a cluster of cellular devices comprises:
determining a location of a plurality of cellular devices based on global position system measurements; and
determining the given proximity based on the location of the plurality of cellular devices.

4. The method of claim 1, wherein only the seed receives the content item directly from the cellular tower.

5. The method of claim 1, wherein identifying a schedule associated with a content item to be distributed to the cluster of cellular devices comprises retrieving a predetermined schedule associated with the content item.

6. The method of claim 1, further comprising transmitting the schedule and a cluster map to another cellular device in the cluster of cellular devices.

7. A system for conserving bandwidth, comprising:
a memory for storing a program containing code for conserving bandwidth; and
a processor functionally coupled to the memory, the processor being responsive to computer-executable instructions contained in the program and operative to at least:
identify a cluster of cellular devices, each cellular device in the cluster being within a given proximity from another cellular device in the cluster,
select a seed from the cluster of cellular devices,
identify a schedule associated with a content item to be distributed to the cluster of cellular devices, the schedule identifying which of the cellular devices in the cluster receive the content item, wherein to identify the schedule associated with the content item to be distributed to the cluster of cellular devices, the processor is further operative to at least dynamically generate the schedule based on an initiation of another applicable program at the cluster of cellular devices, and
instruct a cellular tower to transmit the content item and the schedule to the seed, wherein the seed forwards the content item to another cellular device in the cluster according to the schedule.

8. The system of claim 7, wherein each cellular device and subset of multiple cellular devices in the cluster is capable of communicating with another cellular device in the cluster via a peer-to-peer protocol.

9. The system of claim 7, wherein to identify a cluster of cellular devices, the processor is further operative to at least:
determine a location of a plurality of cellular devices based on global position system measurements, and
determine the given proximity based on the location of the plurality of cellular devices.

10. The system of claim 7, wherein only the seed receives the content item directly from the cellular tower.

11. The system of claim 7, wherein to identify a schedule associated with a content item to be distributed to the cluster of cellular devices, the processor is further operative to at least retrieve a predetermined schedule associated with the content item.

12. A computer-readable medium having instructions stored thereon for execution by a processor to provide a method for conserving bandwidth, the method comprising:
identifying a cluster of cellular devices, each cellular device in the cluster being within a given proximity from another cellular device in the cluster;
selecting a seed from the cluster of cellular devices;
identifying a schedule associated with a content item to be distributed to the cluster of cellular devices, the schedule identifying which of the cellular devices in the cluster receive the content item, wherein identifying the schedule associated with the content item to be distributed to the cluster of cellular devices comprises dynamically generating the schedule based on an initiation of another applicable program at the cluster of cellular devices; and
instructing a cellular tower to transmit the content item and the schedule to the seed, wherein the seed forwards the content item to another cellular device in the cluster according to the schedule.

13. The computer-readable medium of claim 12, wherein each cellular device and subset of multiple cellular devices in the cluster is capable of communicating with another cellular device in the cluster via a peer-to-peer protocol.

14. The computer-readable medium of claim 12, wherein identifying a cluster of cellular devices comprises:

determining a location of a plurality of cellular devices based on global position system measurements; and determining the given proximity based on the location of the plurality of cellular devices.

15. The computer-readable medium of claim 12, wherein only the seed receives the content item directly from the cellular tower.

16. The computer-readable medium of claim 12, wherein identifying a schedule associated with a content item to be distributed to the cluster of cellular devices comprises retrieving a predetermined schedule associated with the content item.

17. The computer-readable medium of claim 12, the method further comprising transmitting the schedule and a cluster map to another cellular device in the cluster of cellular devices.

* * * * *